Sept. 27, 1938.   R. B. COTTRELL   2,131,703
BRAKE
Filed Oct. 26, 1936   2 Sheets-Sheet 1

Inventor:
Robert B Cottrell,
By Orin O. B. Garner Atty.

Sept. 27, 1938. R. B. COTTRELL 2,131,703
BRAKE
Filed Oct. 26, 1936    2 Sheets—Sheet 2

Inventor:
Robert B Cottrell,
By Orin O. B. Garner atty

Patented Sept. 27, 1938

2,131,703

UNITED STATES PATENT OFFICE 2,131,703

BRAKE

Robert B. Cottrell, Chicago, Ill., assignor to American Steel Foundries, Chicago, Ill., a corporation of New Jersey Application October 26, 1936, Serial No. 107,575

28 Claims. (Cl. 188—53)

My invention relates to railway brake equipment and more particularly to a special design of brakes for application to trucks wherein the load carrying member is supported on the side frames without any interposed medium such as springs or snubbing devices.

In the ordinary type of railway car truck the most usual practice is to support the load carrying member on the side members of the truck frame through the medium of coil springs, or a combination of coil and elliptic springs, or coil springs and snubbing devices. In the type of truck with which we are here concerned, however, the load carrying member serves as a connection between the two side frames and is supported directly thereon, and the resilient medium consisting of springs or snubbing devices is interposed between the wheel and axle assemblies and the ends of the side frames. The springs may be seated on the tops of journal boxes which are supported on the journal ends of the axle in the usual manner and the springs are received in pockets in the side frames, the connection between the side frames and the journal boxes being in the form of pedestal jaws on the side frames and guide means on the journal boxes.

An object of my invention is to provide a very simple and compact form of braking arrangement for a truck such as that above described wherein there is no relative vertical motion between the transverse load carrying member and the side members.

Another object of my invention is to provide a brake rigging in such a type of truck wherein a single double-acting power means will be supported from the load carrying member and will operate to actuate brake mechanism at both ends of the truck.

Another object of my invention is to provide maximum simplicity in a brake rigging for a four wheel railway car truck, thus conserving all possible space and reducing to a minimum wear between parts.

With these and various other objects in view, my invention may consist of certain novel features of construction and operation as will be more fully described and particularly pointed out in the specification, drawings and claims appended hereto.

In the drawings which illustrate embodiments of the invention and wherein like reference characters are used to designate like parts—

Figure 1:
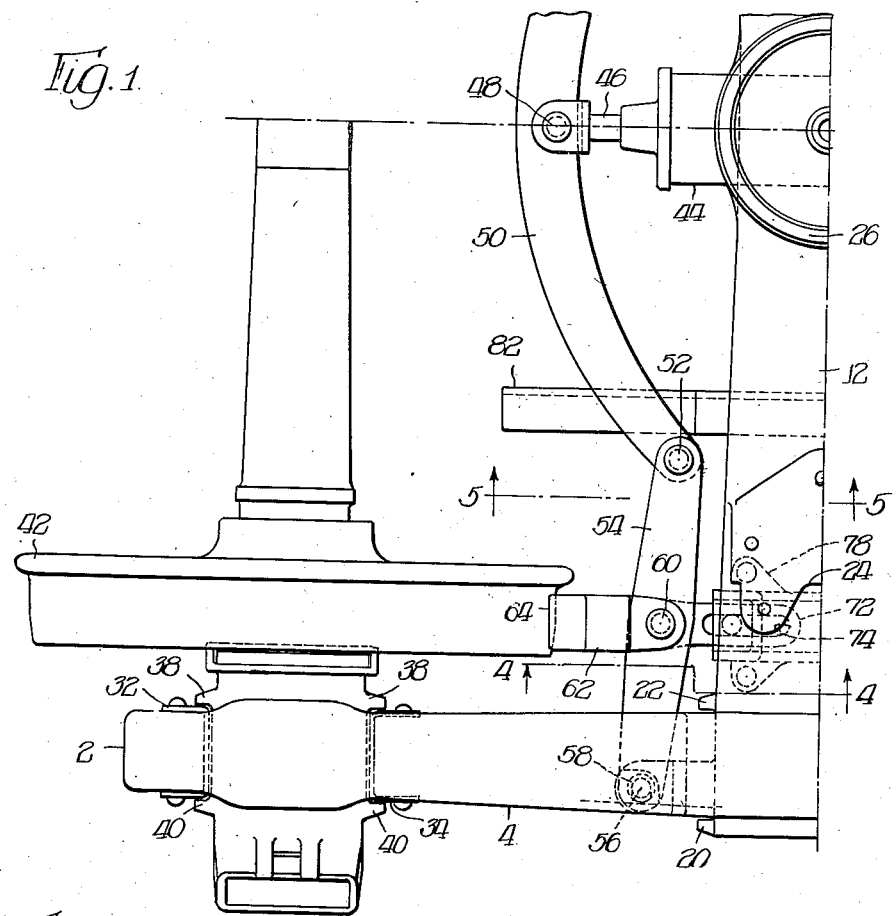
Figure 1 is a top plan view of a truck construction embodying my invention, only one side and one end of the truck being shown inasmuch as the construction is the same at the opposite sides and at the opposite ends of the truck.
Figure 2:
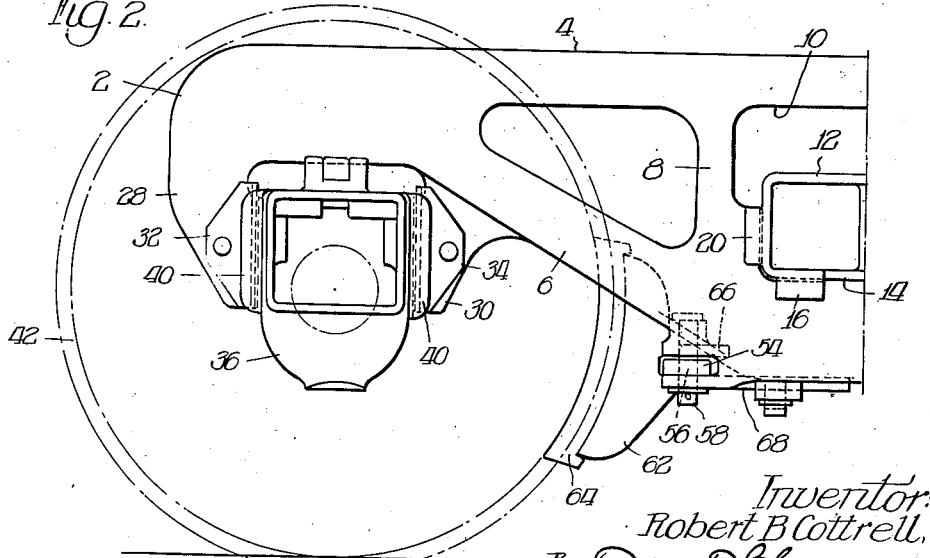
Figure 2 is a side elevation of the truck and brake structure shown in Figure 1.
Figure 3:
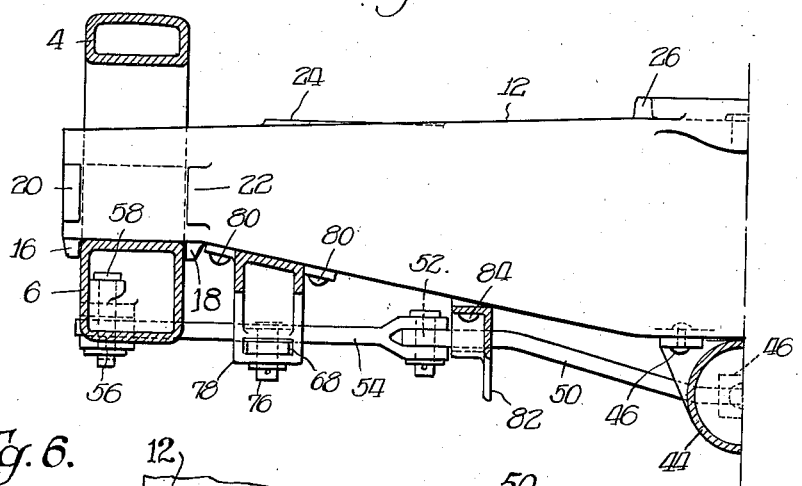
Figure 3 is a sectional view of the truck and brake structure shown in Figures 1 and 2, the section being taken substantially in the plane bisecting the truck transversely.
Figure 6:
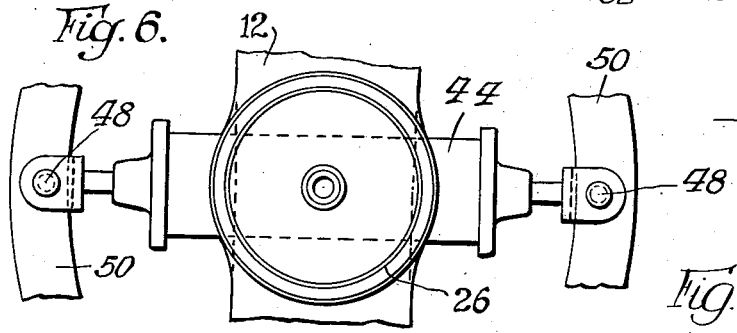
Figure 6 is a fragmentary top plan view of the truck construction shown in Figures 1 to 5, showing the manner of cooperation between the double acting cylinder and the equalizers at opposite ends of the truck.

In the embodiment shown the truck comprises truss type side frames 2 having the compression member 4 and the tension member 6 joined intermediate their ends by the spaced columns 8 and forming therewith the centrally located window opening 10 within which may be received and seated the load carrying member or bolster 12, the end of the said bolster being positioned on top of the tension member 6 as at 14 and secured in position by the outer and inner depending lugs 16 and 18 and by the laterally extending outer and inner lugs 20 and 22. The bolster has the usual side bearings 24 and center bearing 26 for association with a complementary bearing on the car body. The ends of the side frame have the inner and outer pedestals 28 and 30 with their respective wear plates 32 and 34 for association with the cooperating portion of the journal box 36, said journal box being provided with the inner and outer retaining flanges or guide lugs 38 and 40, the journal box 36 providing the usual means of association between such a side frame and the wheel and axle assembly 42. Spring or snubber means (not shown) may be seated on the top of the journal box 36 and provide a resilient support for the end of the side frame.

Adjacent the longitudinal center line of the truck and on the bottom side of the bolster 12 may be secured the double-acting power means or brake cylinder 44, said cylinder having at its opposite ends the pistons 46, each of which is pivotally connected at its outer end as at 48 to the midpoint of an arcuately formed equalizing lever 50. Each end of the equalizing lever 50 is pivotally connected as at 52 to a brake lever 54, the outer end of said brake lever being fulcrumed as at 56 from the tension member 6 of the side frame 2, being secured thereto by the bolt and cotter assembly 58.

Figure 4:
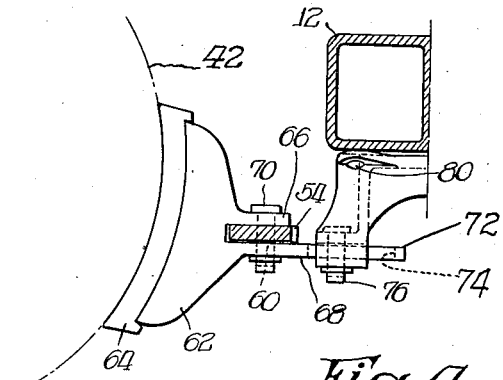
Figure 4 is a sectional view of the truck structure, the section being taken in the plane indicated by the line 4—4 of Figure 1.

Intermediate the ends of the brake lever 54 as at 60 is pivotally supported the brake head 62 with its associated brake shoe 64, said brake head being provided with the rearwardly extending upper jaw 66 and the elongated lower jaw 68 between which may be received the brake lever 54, securing means for said connection being provided in the form of the pin and cotter assembly 70 (Figure 4). The lower jaw 68 has at its outer end the loop portion 72 forming in the elongated slot 74 an adjustable connection, through the medium of the pin and cotter assembly 76, with the guide bracket 78, said bracket being supported on the bottom of the load carrying member 12 as by means of the rivets 80.

Figure 5:
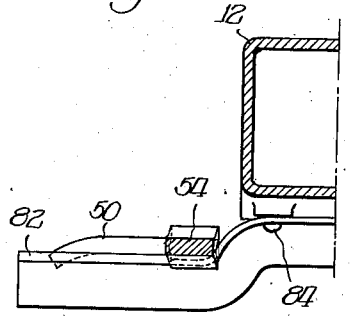
Figure 5 is a sectional view taken substantially in the plane indicated by the line 5—5 of Figure 1.

Sliding support for the opposite ends of the equalizing lever 50 is provided by channel-shaped members 82 (Figure 5), said channel-shaped members being secured to the under side of the bolster as by the rivets 84.

In operation, actuation of the double-acting power means 44 causes outward movement of the piston 46, thus moving the equalizing lever 50 to the left (Figure 1) and causing the brake lever 54 to rotate in a counter-clockwise direction about the fulcrum point 56 at its outer end until the brake shoe 64 carried by the brake head 62 and supported on the brake lever 54 intermediate its ends is brought into engagement with the periphery of the adjacent wheel. In this movement the brake head is balanced and guided by its sliding connection through the elongated jaw 68 with the guide bracket 78. Release of the power means will cause the parts to move in directions opposite to those just indicated until they assume their normal inoperative position. It will be understood, of course, that the rigging at the opposite ends of the truck is operated simultaneously by the pistons extending from the opposite ends of the double-acting power means 44.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging for a four wheel railway car truck the combination of a truck frame comprising side members, a transverse load carrying member supported directly thereon, wheel and axle assemblies, double-acting power means supported from said load carrying member substantially in the longitudinal center line of said truck, guide brackets supported from said load carrying member adjacent the opposite ends thereof, pairs of brake levers fulcrumed from each of said side members and pivotally supporting brakeheads intermediate their ends for cooperation with adjacent wheels, said brake heads having means for cooperation with said guide brackets, and equalizers connected between said brake levers at opposite ends of said truck, the opposite ends of said power means having direct pivotal connections respectively with said equalizers.

2. In a railway car truck the combination of a truck frame comprising side members, a load carrying member connecting said side members and supported directly thereon, wheel and axle assemblies, double-acting power means supported from said load carrying member, and brake means comprising a brake head supported adjacent each wheel, a plurality of brake levers fulcrumed from said side members intermediate the wheels, the corresponding brake levers at the opposite sides of the truck having their inner ends connected to equalizers, and operative connections between said equalizers and said double-acting power means.

3. In a brake rigging for a four wheel railway car truck the combination of a truck frame comprising side members, a load carrying member, wheel and axle assemblies, double-acting power means supported from said load carrying member adjacent the longitudinal center line of said truck, pairs of brake levers fulcrumed from said side members intermediate the wheels and supporting brake heads intermediate their ends for cooperation with the adjacent wheels, and equalizers connected between the corresponding brake levers at the opposite sides of the truck, said power means being directly connected between said equalizers at the opposite ends of the truck.

4. In a railway car truck the combination of a truck frame comprising a side member, a transverse load carrying member, wheel and axle assemblies, double-acting power means supported from said load carrying member adjacent the longitudinal center line of said truck, pistons associated with the opposite ends of said power means, equalizers connected to said pistons, a plurality of horizontally arranged brake levers having their outer ends fulcrumed from said side member and their inner ends connected respectively to said equalizers, and brake heads pivotally supported intermediate the ends of said brake levers for cooperation with adjacent wheels.

5. In a railway car truck the combination of a truck frame comprising side members, a transverse load carrying member supported directly thereon, power means supported from said load carrying member adjacent the longitudinal center line of said truck, wheel and axle assemblies, brake levers having their outer ends fulcrumed from said side members and their inner ends connected to the opposite ends of an equalizer, a direct pivotal connection between said equalizer and a piston associated with said power means, and brake heads pivotally supported intermediate the ends of said brake levers for cooperation with adjacent wheels.

6. In a railway car truck the combination of a truck frame comprising side members, a load carrying member connected therebetween, power means mounted on said load carrying member, wheel and axle assemblies, pairs of brake levers fulcrumed from each of said side members, equalizers connecting the corresponding levers at the opposite sides of said truck, said equalizers having direct connections to the opposite ends of said power means, guide brackets supported adjacent the opposite ends of said load carrying member, and brake heads pivotally supported intermediate the ends of said brake levers, each of said brake heads having means cooperating with one of said guide brackets.

7. In a brake rigging for a four wheel railway car truck the combination of a truck frame comprising side members, a transverse load carrying member supported directly thereon, double-acting power means supported from said load carrying member, a plurality of horizontally arranged brake levers having their outer ends fulcrumed from said side members and supporting intermediate their ends brake heads for cooperation with the adjacent wheels at the opposite ends of the truck, and equalizers operatively connected intermediate their ends to pistons at the opposite ends of said power means, said respective equalizers having their opposite ends connected to the inner ends of corresponding brake levers at opposite sides of said truck.

8. In a brake rigging for a railway car truck the combination of a truck frame comprising a side frame, a load carrying member, a wheel and axle assembly, power means and guide means supported on said load carrying member, a dead lever fulcrumed from said side frame and supporting a brake head intermediate its ends for cooperation with an adjacent wheel, an equalizer operatively connected to said power means and to said brake lever, and means on said brake head cooperating with said guide means on said load carrying member.

9. In a brake rigging for a railway car truck the combination of a truck frame comprising side members, a load carrying member, a wheel and axle assembly, power means and guide means supported from said load carrying member, dead levers fulcrumed respectively from said side members and supporting brake heads intermediate their ends for cooperation with said wheels, and an equalizer operatively connected intermediate its ends to said power means and at its opposite ends to said dead levers, said brake heads having means cooperating respectively with said guide means on said load carrying member.

10. In a brake rigging for a railway car truck the combination of a truck frame comprising side members, a load carrying member, wheel and axle assemblies, power means supported from said load carrying member, a pair of horizontally arranged dead levers fulcrumed from each of said side members, equalizers connecting the inner ends of the corresponding dead levers at opposite ends of the truck, and operative connections respectively between said equalizers and opposite ends of said power means.

11. In a railway car truck the combination of a truck frame comprising a side member, a transverse load carrying member, wheel and axle assemblies, double-acting power means supported from said load carrying member adjacent the longitudinal center line of said truck, pistons associated with the opposite ends of said power means, equalizers connected to said pistons, and a plurality of horizontally arranged brake levers having their outer ends fulcrumed from said side member and their inner ends connected respectively to said equalizers.

12. In a railway car truck the combination of a truck frame comprising side members, a transverse load carrying member supported directly thereon, power means supported from said load carrying member adjacent the longitudinal center line of said truck, brake levers having their outer ends fulcrumed from said side members and their inner ends connected to the opposite ends of an equalizer, and a direct pivotal connection between said equalizer and a piston associated with said power means.

13. In a brake rigging for a railway car truck the combination of a truck frame comprising side members, a load carrying member, a wheel and axle assembly, power means and guide means supported from said load carrying member, dead levers fulcrumed respectively from said side members and supporting brake heads intermediate their ends for cooperation with said wheels and said guide means, and an equalizer operatively connected intermediate its ends to said power means and at its opposite ends to said dead levers.

14. In a railway car truck the combination of a truck frame comprising side members, a load carrying member connected therebetween, power means mounted on said load carrying member, wheel and axle assemblies, pairs of brake levers fulcrumed from each of said side members, and equalizers connecting the corresponding levers at the opposite sides of said truck, said equalizers having direct connections to the opposite ends of said power means.

15. In a four wheel railway car truck the combination of a truck frame comprising a side member, a load carrying member, a wheel and axle assembly, power means supported on said load carrying member, a horizontally arranged brake lever having its outer end fulcrumed from said side member and supporting intermediate its ends a brake head for cooperation with an adjacent wheel, and an equalizer having its midpoint connected to said power means and an end connected to said brake lever.

16. In brake rigging for a railway car truck the combination of a truck frame comprising a side frame, a load carrying member, a wheel and axle assembly, power means and guide means supported on said load carrying member, a dead lever fulcrumed on said side frame and supporting intermediate its ends a brake head for cooperation with an adjacent wheel, an operative connection between said dead lever and said power means, and means on said brake head cooperating with said guide means.

17. In brake rigging for a railway car truck the combination of a truck frame comprising a side frame, a load carrying member, a wheel and axle assembly, power means and guide means supported on said load carrying member, a dead lever fulcrumed from said side frame and supporting a brake head intermediate its ends for cooperation with an adjacent wheel, and an equalizer operatively connected between said power means and said brake lever.

18. In a brake rigging for a railway car truck the combination of a truck frame comprising side members, a transverse load carrying member, power means supported from one of said members, a dead lever fulcrumed on each of said side members, an equalizer interconnected between said dead levers, and an operative connection between said equalizer and said power means.

19. In brake rigging for a railway car truck the combination of a truck frame comprising a side member, a load carrying member, power means supported on said load carrying member, wheel and axle assemblies, a dead lever fulcrumed on said side member and supporting a brake head intermediate its ends and an operative connection between said dead lever and said power means.

20. In a brake rigging, a brake head comprising rear jaws arranged for cooperation with a horizontal lever, one of said jaws being extended to form guide means for cooperation with an adjacent load carrying member.

21. In a four wheel railway car truck the combination of a truck frame comprising a side member, a load carrying member, a wheel and axle assembly, power means supported on said load carrying member, a horizontally arranged brake lever having its outer end fulcrumed from said side member and supporting intermediate its ends a brake head for cooperation with an adjacent wheel, and an equalizer having its midpoint connected to said power means and an end connected to said brake lever, said brake head having guide means cooperating with means on said load carrying member.

22. In brake rigging for a railway car truck the combination of a truck frame comprising a side frame, a load carrying member, a wheel and axle assembly, power means and guide means supported on said load carrying member, a dead lever fulcrumed from said side frame and supporting a brake head intermediate its ends for cooperation with an adjacent wheel, and an equalizer operatively connected between said power means and said brake lever, said load carrying member having means cooperating with guide means on said brake head.

23. In a brake rigging for a railway car truck the combination of a truck frame comprising side members, a transverse load carrying member, power means supported from one of said members, a dead lever fulcrumed on each of said side members, and an operative connection between said dead levers and said power means, said connection comprising an arcuate equalizer.

24. In brake rigging for a railway car truck the combination of a truck frame comprising a side member, a load carrying member, power means supported on said load carrying member, wheel and axle assemblies, a dead lever fulcrumed on said side member and supporting a brake head intermediate its ends and an operative connection between said dead lever and said power means, said connection comprising an arcuate equalizer.

25. In a brake rigging a brake head comprising rear jaws arranged for cooperation with a horizontal lever, one of said jaws including guide means for cooperation with an adjacent load carrying member.

26. A railway truck comprising spaced side members and a load carrying member, power means on said load carrying member, brake levers fulcrumed on said side members respectively, an equalizer interconnecting said levers, and a connection between said power means and said equalizer.

27. A railway truck comprising spaced side members and a load carrying member, power means on said load carrying member, brake levers fulcrumed on said side members respectively, an equalizer interconnecting said levers, and a connection between said power means and said equalizers, said levers carrying brake heads for cooperation respectively with spaced wheels.

28. A railway truck comprising spaced side members and a load carrying member, power means on said load carrying member, brake levers fulcrumed on said side members respectively, an equalizer interconnecting said levers, and a connection between said power means and said equalizer, said levers carrying brake heads for cooperation respectively with spaced wheels, and guide means on said brake heads cooperating with said load carrying member.

ROBERT B. COTTRELL.